US007392166B2

(12) United States Patent
Le Ravalec-Dupin et al.

(10) Patent No.: US 7,392,166 B2
(45) Date of Patent: Jun. 24, 2008

(54) METHOD FOR MORE RAPIDLY PRODUCING THE REPRESENTATIVE STOCHASTIC MODEL OF A HETEROGENEOUS UNDERGROUND RESERVOIR DEFINED BY UNCERTAIN STATIC AND DYNAMIC DATA

(75) Inventors: Mickaële Le Ravalec-Dupin, Rueil Malmaison (FR); Frédéric Roggero, Pau (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/546,452

(22) PCT Filed: Feb. 18, 2004

(86) PCT No.: PCT/FR2004/000363

§ 371 (c)(1),
(2), (4) Date: Aug. 19, 2005

(87) PCT Pub. No.: WO2004/079144

PCT Pub. Date: Sep. 16, 2004

(65) Prior Publication Data

US 2006/0149520 A1    Jul. 6, 2006

(30) Foreign Application Priority Data

Feb. 21, 2003  (FR) .................................. 03 02199

(51) Int. Cl.
*G06G 7/48* (2006.01)
*G06G 7/50* (2006.01)
(52) U.S. Cl. ............................................. 703/10; 703/9
(58) Field of Classification Search .................. 703/10, 703/9
See application file for complete search history.

(56) References Cited

U.S. PATENT DOCUMENTS

| 5,325,533 | A  | * | 6/1994  | McInerney et al. .......... 717/107 |
| 6,388,947 | B1 | * | 5/2002  | Washbourne et al. ......... 367/73 |
| 6,662,109 | B2 | * | 12/2003 | Roggero et al. ................ 702/6 |
| 6,804,625 | B1 | * | 10/2004 | Bryant ........................ 702/179 |
| 2001/0027389 | A1 | * | 10/2001 | Beverina et al. .............. 703/22 |

(Continued)

FOREIGN PATENT DOCUMENTS

| FR | 2 780 798 | 1/2000 |
| FR | 2 795 841 | 1/2001 |
| FR | 2 823 877 | 10/2002 |

OTHER PUBLICATIONS

Lisle, Thomas E.; Church, Michael 2002. Sediment transport-storage relations for degrading, gravel bed channels Water Resources Research 38(11): 1219, doi:10.1029/2001WR001086, 2002.*

(Continued)

*Primary Examiner*—Kamini S Shah
*Assistant Examiner*—David Silver
(74) *Attorney, Agent, or Firm*—Antonelli, Terry, Stout & Kraus, LLP.

(57) ABSTRACT

A method for more rapidly forming a stochastic model of Gaussian or Gaussian-related type, representative of a porous heterogeneous medium such as an underground reservoir, constrained by data characteristic of the displacement of fluids and punctual observations, these observations being uncertain and characterized by a probability law. The method transforms static information, given in form of probability laws, into Gaussian punctual pseudo-data which has the advantage of being compatible with a gradual deformation method. An objective function J measuring the difference between the dynamic data (production data for example) and the corresponding responses simulated for the reservoir model considered may be minimized.

18 Claims, 3 Drawing Sheets

U.S. PATENT DOCUMENTS

| | | | |
|---|---|---|---|
| 2003/0100451 A1* | 5/2003 | Messier et al. | 507/100 |
| 2003/0115029 A1* | 6/2003 | Calvert et al. | 703/10 |
| 2003/0173072 A1* | 9/2003 | Vinegar et al. | 166/66.5 |
| 2003/0192693 A1* | 10/2003 | Wellington | 166/267 |
| 2004/0138862 A1* | 7/2004 | Hu et al. | 703/2 |
| 2006/0241920 A1* | 10/2006 | Le Ravalec-Dupin et al. | 703/2 |
| 2007/0055447 A1* | 3/2007 | Mickaele et al. | 702/7 |

OTHER PUBLICATIONS

E. Manceau, M. Mezghani, I. Zabalza-Mezghani, F. Roggero, IFP, "Combination of Experimental Design and Joint Modeling Method for Quantifying the Risk Associated With Deterministic and Stochastic Uncertainties—An Integrated Test Study", 2001,. Society of Petroleum Engineers Inc. (abstract and introduction only).*

L.Y. Hu, M. Le Ravalec, G. Blanc, F. Roggero, B. Noetinger, Institut Français du Petrole; A. Haas, B. Corre, Elf Exploration & Production, "Reducing Uncertainties in Production Forecasts by Constraining Geological Modeling to Dynamic Data"; Copyright 1999, Society of Petroleum Engineers Inc. (abstract and introduction only).*

Blanc, G., Guerillot, D., Rahon, D., Roggero, F., IFP; HELIOS Reservoir group; "Building Geostatistical Models Constrained by Dynamic Data—A Posteriori Constraints"; Copyright 1996, Society of Petroleum Engineers, Inc. (abstract and introduction only).*

L. Y. Hu et al, "Reducing Uncertainties in Production Forecasts by Constraining Geological Modelling to Dynamic Data"; 1999, SPE 56703, pp. 1-8.*

Liu, "Assessment of Uncertainty Assessment Methods", PhD Thesis, University of Tulsa, 2001.*

Ravalec-Dupin Le, M. Et al: "Optimization with the Gradual Deformation Method", *Mathematical Geology*, Plenum Press, London, GB, vol. 34, No. 2, Feb. 2002, pp. 125-142 (XP008021586), ISSN: 0882-8121.

"Technical Aspects of Geostatistics", Engineering and Design—Practical Aspects of Applying Geostatistics at Hazardous, Toxic and Radioactive Waste Sites, XX, XX, Jun. 30, 1997, pp. 2-1 through 2-17, XP002193129.

Freulon, Xavier et al, "Conditioning a Gaussian Model With Inequalities", in Geostatistics Trola'92, A. Soares, ed., Kluwer Academic Publishers, Dordrecht, The Netherlands, 1993.

Le Ravalec-Dupin, M., "Conditioning truncated Gaussian realizations to static data", 8th Ann. Conf. Int. Ass. Math. Geol., Berlin, Germany, Sep. 15-20, 2002, 6 pgs.

Hu, L.Y., 2000, Gradual Deformation and Iterative Calibration of Gaussian-Related Stochastic Models *Mathematical Geology*, vol. 32, No. 1, pp. 87-108.

Le Ravalec, M, et al, 2000, The EFT Moving Average (FFT-MA) Generator" An Efficient Numberical Method for Generating and Conditioning Gaussian Simulations" *Mathematical Geology*, vol. 32, No. 6, pp. 701-723.

Hu, L.Y. et al (2001), "Gradual Deformation and Iterative Calibration of Sequential Stochastic Simulations", *Mathematical Geology*, vol. 33, No. 4, 2001, pp. 475-489.

Roggero, F. et al, 1998, "Gradual Deformation of Continuous Geostatistical Models for History Matching", Paper SPE 49004: Proc. SPE Annual Technical Conference and Exhibition, New Orleans, pp. 221-236.

Hu, L.Y. et al, 1998, "Constraining a Reservoir Facies Model to Dynamic Data Using a Gradual Deformation Method", Paper B-01: Proc. 6th European Conference on Mathematics of Oil Recovery (ECMOR VI), Sep. 9-11, 1998, Peebles, Scotland, 7 pgs.

* cited by examiner

METHOD FOR MORE RAPIDLY PRODUCING THE REPRESENTATIVE STOCHASTIC MODEL OF A HETEROGENEOUS UNDERGROUND RESERVOIR DEFINED BY UNCERTAIN STATIC AND DYNAMIC DATA

BACKGROUND OF THE INVENTION

1. Field of the Invention

The present invention relates to a method for forming more rapidly a stochastic numerical model of Gaussian or Gaussian-related type, representative of the spatial distribution of a physical quantity (such as the permeability for example) in a porous heterogeneous medium (such as a hydrocarbon reservoir for example) calibrated in relation to data referred to as uncertain static and dynamic data.

2. Description of the Prior Art

Optimization in a stochastic context determines realizations of a stochastic model which meet a set of data observed in the field, referred to as static or dynamic data depending on the nature thereof. Static data correspond to observations on the studied physical quantity proper. When it is certain, the static datum is an exact value. In the opposite case, it is defined by a probability law. Dynamic data are characteristic of the displacement of fluids in the medium: they are, for example, production data (pressures obtained from well tests, flow rates, etc.).

In reservoir engineering, the realizations to be identified correspond to representations, in the reservoir field, of the distribution of carrying properties such as the permeability, the porosity or the facies distribution, each facies corresponding to a family of carrying properties. These realizations form numerical reservoir models. The available static data are, for example, punctual permeability, porosity or facies observations, and a spatial variability model determined according to punctual measurements. The punctual data can be defined by probability laws rather than exact values. For example, at a given point, a porosity value can be characterized by a normal probability law of mean 0.20 and variance 0.03. The dynamic data are directly related to the fluid flows in an underground reservoir, that is pressures, breakthrough times, flow rates, etc. The latter are often non-linearly related to the physical properties to be modeled. A randomly drawn realization is generally not in accordance with the whole of the data collected.

Static Data Integration

Coherence in relation to the static data is integrated in the model from kriging techniques Journel, A. G., and Huijbregts, C. J., "Mining Geostatistics", Academic Press, San Diego, Calif., 1978.

The general approach generates a non-conditional realization and in correcting it so that it meets the punctual observations and the spatial structure. Within this context, the punctual observations are assumed to be exact values (for example, at a given point, the permeability is 150 mD). Let there be a Gaussian and non-conditional realization y of the stochastic model Y. The corrected realization is obtained as follows:

$$y_c(x) = y_{dK}(x) + [y(x) - y_K(x)]$$

$y_c$ is the corrected and therefore conditional Gaussian realization. $y_{dK}$ and $y_K$ are obtained by kriging from the punctual observations and from the values of y simulated at the observation points.

When the punctual observations do not correspond to exact values, but are defined by probability laws, it is possible to use either a Bayesian approach, which is extremely time-consuming in making calculations, or a kriging technique. In the latter case, on which focus occurs herein, a preliminary stage is necessary to transform the probability law into a punctual value. This transformation cannot be any transformation: the punctual values obtained must meet the spatial structure and the probability laws from which they result. Clearly, the relation between probability laws and punctual values is not a single relation. Iterative transformation methods have been proposed for facies realizations, where the probability law is a uniform law, by:

Freulon, X., and Fouquet, C. de, "Conditioning a Gaussian Model with Inequalities", in Geostatistics Troia '92, A. Soares, ed., Kluwer Academic Publishers, Dordrecht, The Netherlands, 1993, Le Ravalec-Dupin, M., "Conditioning Truncated Gaussian Realizations to Static Data", 8$^{th}$ Ann. Conf. Int. As. Math. Geol., Berlin, Germany, 15-20 Sep., 2002.

These techniques tend towards the desired probability density function, but very slowly. In practice, it is not desired to completely sample this function. A single set of punctual values meeting the spatial distribution and the probability laws is merely determined and it is used to obtain the corrected realization $y_c$. It is this single and therefore invariable set that the optimization process constantly refers to so as to form realizations constrained simultaneously by the static and the dynamic data. This point is fundamental in the optimization process.

Dynamic Data Integration

Coherence in relation to the dynamic data is integrated in the model by means of an inverse procedure:

Tarantola, A., "Inverse Problem Theory—Methods for Data Fitting and Model Parameter Estimation", Elsevier Science Publishers, 1987.

Recently, a geostatistical parameterization technique which simplifies the inverse problem has been introduced to constrain, by gradual deformation, the stochastic realizations to data on which they depend non-linearly. It forms the object of French Patents 2,780,798 and 2,795,841 filed by the assignee, and of the following publications, notably:

Hu, L. Y., 2000, Gradual Deformation and Iterative Calibration of Gaussian-Related Stochastic Models: Math. Geology, Vol. 32, No. 1, Le Ravalec, M. et al., 2000, The FFT Moving Average (FFT-MA) Generator: An Efficient Numerical Method for Generating and Conditioning Gaussian Simulations: Math. Geology, Vol. 32, No. 6, Hu, L. Y., Blanc, G. And Noetinger, B. (2001): Gradual Deformation and Iterative Calibration of Sequential Stochastic Simulations. Math. Geology, Vol. 33, No. 4.

This method has been successfully applied in various cases, notably from data obtained from oil development fields, as described in the following documents:

Roggero, F. et al., 1998, Gradual Deformation of continuous Geostatistical Models for History Matching, paper SPE 49004: Proc. SPE Annual Technical Conference and Exhibition, New Orleans, Hu, L. Y. et al., 1998, Constraining a Reservoir Facies Model to Dynamic Data Using a Gradual Deformation Method, paper B-01: Proc. 6$^{th}$ European Conference on Mathematics of Oil Recovery (ECMOR VI), 8-11 Sep. 1998, Peebles, Scotland.

Assuming that $f^{obs} = (f_1^{obs}, f_2^{obs}, \ldots, f_M^{obs})$ represents all of the dynamic data collected in the field and $f = (f_1, f_2, \ldots, f_M)$ the corresponding responses simulated for a realization $y_c$ already constrained by the static data are as explained above. In general, the responses $f = (f_1, f_2, \ldots, f_M)$ are obtained by solving numerically the direct problem. Thus, if $y_0$ represents a permeability field, data f can be pressure measurements. In this case, they are simulated from a flow simulator. The goal of a stochastic optimization is to produce realizations of Y which reduce the differences between the observed data and the numerically simulated corresponding responses. These differences are measured by the following objective function:

$$J = \frac{1}{2}\sum_{m=1}^{M}\omega_m(f_m - f_m^{obs})^2$$

Coefficients $\omega_m$ are weights assigned to data $f_m^{obs}$. $f_m$ are functions of realization $y_0$ discretized over a large number of grid cells. In this sense, minimization of the objective function is a problem with several variables.

Let N be the number of grid cells forming realization $y_0$. N is often very large ($10^4$~$10^7$). It is therefore very difficult to perform an optimization directly in relation to the components of $y_0$. Furthermore, realization $y_0$, even modified, must remain a realization of Y. Parameterization by gradual deformation allows these difficulties to be overcome.

The gradual deformation technique allows construction of a continuous chain of realizations by combining an initial realization $y_0$ of Y with another realization $u_1$, referred to as complementary, of Y, $u_1$ being independent of $y_0$. The combination coefficients are for example cos(t) and sin(t), and the combined realization meets the relation $$y(t) = y_0 \cos t + u_1 \sin t$$

where t is the deformation parameter.

Once the chain is formed, it can be explored by varying deformation parameter t and an attempt is made to identify, from among all the realizations of this chain, the realization which minimizes the objective function after integration of the static data by kriging. This minimization is performed in relation to t. Parameterization according to the gradual deformation method allows reduction of the number of dimensions of the problem from N to 1, where N is the number of values that constitute the field to be constrained. Furthermore, the sum of the combination coefficients squared being 1, the optimized realization still is a realization of Y: it follows the same spatial variability model as all the realizations of Y.

However, if the exploration of the realizations space is restricted to a single chain, the possibilities of sufficiently reducing the objective function are greatly limited. The above procedure therefore has to be repeated, but with new realization chains. These realization chains are constructed successively by combining an initial realization, which is here the optimum realization determined at the previous iteration, with a complementary realization of Y, randomly drawn each time. Thus, at iteration l, the continuous realization chain is written as follows:

$$y_l(t) = y_{l-1} \cos t + u_l \sin t.$$

$y_{l-1}$ is the optimum realization defined at iteration l-1 and the $u_l$ are independent realizations of Y.

Minimizing the objective function in relation to t allows improvement or at least preservation of calibration of the data each time a new realization chain is explored. This iterative minimum search procedure is continued as long as data calibration is not satisfactory.

To date, the punctual values integrated by kriging in the model to account for the static data remain constant throughout the optimization process, even when they correspond to uncertain values. In the latter case, such a hypothesis can significantly slow down the optimization process and prevent minimization of the objective function.

SUMMARY OF THE INVENTION

The method according to the invention is to form a stochastic numerical model of Gaussian or Gaussian-related type, representative of the distribution of a physical quantity in a porous heterogeneous medium (oil reservoirs, aquifers, etc.), adjusted in relation to dynamic data, characteristic of the displacement of fluids in the medium, and local static data (for example porosity values defined by normal probability laws or values specifying the nature of the facies observed, defined by uniform probability laws) measured (by well logging for example) at a certain number of measuring points along wells through the medium (production, injection or observation wells for example), and involving a certain uncertainty margin. It comprises optimization of the model by means of an iterative deformation process comprising forming, on each iteration, a combined realization obtained by linear combination on the one hand of an initial realization, best representing a part of the medium, and of at least a second independent realization of the same stochastic model, and a minimization of an objective function measuring the difference between real dynamic data and the dynamic data simulated by means of a flow simulator, for the combined realization, by adjustment of the combination coefficients, the iterative adjustment process being continued until an optimum realization of the stochastic model is obtained. The method comprises:

a) transforming the local static data into punctual pseudo-data in accordance with probability laws and a spatial variability model; and b) adjusting the pseudo-data while respecting the probability laws from which the pseudo-data result, and the spatial variability model, by means of an iterative process wherein a first Gaussian white noise associated with the set of pseudo-data is combined with a second Gaussian white noise.

According to a preferred implementation mode, the model is adjusted by means of a gradual deformation process by imposing that the sum of the squares of the combination coefficients between the realizations is 1 and the pseudo-data are then adjusted by means of an iterative process wherein the sum of the squares of the coefficients of the combination is also 1.

The probability laws are normal laws or uniform laws for example.

Iterative adjustment can be carried out from two deformation parameters for example, with a first parameter controlling the combination between the initial realization and the second realization, and a second parameter controlling the combination between the initial Gaussian white noise and the second Gaussian white noise.

It is also possible to carry out the optimization process from a single parameter when the combination coefficients are identical for the combination of realizations and the combination of Gaussian white noises.

According to another implementation mode, optimization can also be performed by means of a pilot point method.

In other words, the method comprises a new transformation technique associating the probability law characterizing an uncertain local measurement with a punctual pseudo-datum in accordance with the probability law from which the pseudo-datum results and the spatial variability model. The advantage of this approach is that it is fast and fully coherent in relation to the gradual deformation method. In fact, it becomes possible to implement optimization processes wherein the realization and the set of punctual pseudo-data are gradually deformed. Varying this or these two parameter (s) allows exploration of a chain of realizations respecting all the spatial structure required and a chain of data sets respecting all the spatial structure and the probability laws required. The realization and the set of pseudo-data which minimize the objective function then have to be identified.

The method allows reaching more rapidly the formation of a numerical model representative of the medium.

The method according to the invention finds applications in the sphere of underground zone modelling intended to generate representations showing how a certain physical quantity is distributed in a zone of the subsoil (permeability, porosity, facies notably), best compatible with observed or measured data, in order for example to favor the development thereof.

BRIEF DESCRIPTION OF THE DRAWINGS

Other features and advantages of the method according to the invention will be clear from reading the description hereafter of a non limitative application example, with reference to the accompanying drawings wherein.

DETAILED DESCRIPTION

Figure 1:
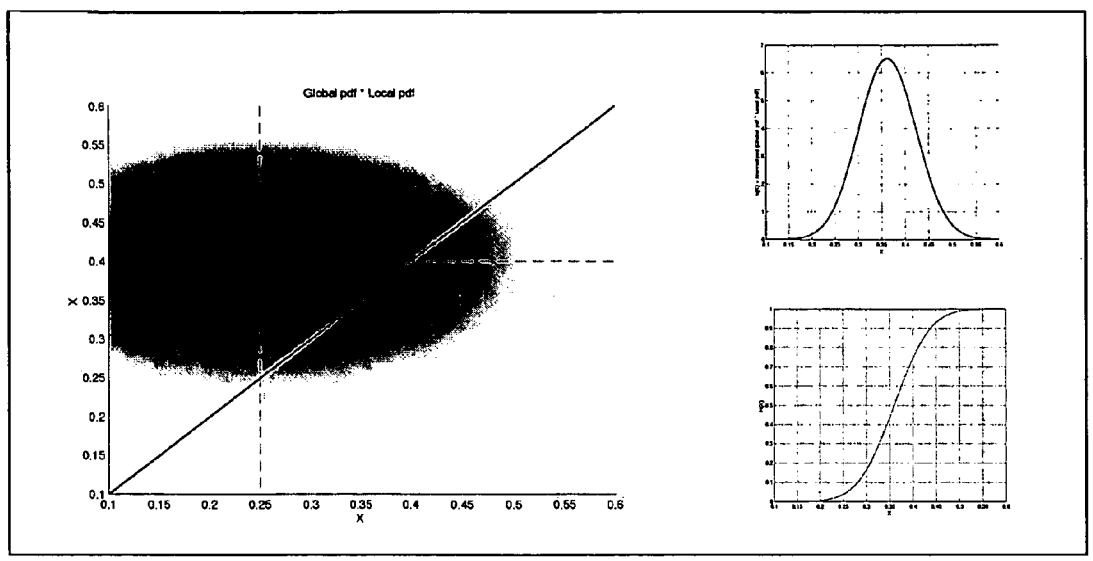
FIG. 1 shows, on the left, $h(x,y) \propto N(F_K, \sigma_K) N(m, \sigma)$ and, on the right, the resulting density and distribution functions. The density function is obtained from the diagonal of $h(x,y)$.

The method according to the invention allows, on each iteration of the minimum search process, to gradually modify the realization itself, as well as the pseudo-data resulting from the probability law transformation process expressing the uncertainty at the measuring points. The latter property gives more flexibility to the optimization process and allows approaching the minimum more rapidly.

Transformation of the Probability Laws Associated with the Measuring Points into Punctual Data A preliminary stage carried out prior to conditioning is based on the transformation of the information supplied as probability laws into punctual pseudo-data. This transformation must allow respecting the spatial structure and the probability laws from which the data result.

It also has to be compatible with the gradual deformation method. It will therefore use, for the standard normal distribution function and its inverse, denoted by $G$ and $G^{-1}$, the analytic approximations discussed by:

Deutsch and Journel, GSLIB—Geostatistical Software Library and User's Guide, Oxford Univ. Press, 1992.

These functions ensure a bijective relation between an initial Gaussian white noise and a set of transformed data. The results obtained are precise to 5 decimal places.

Consider N points $x_{i, i \in [1,N]}$ for which measurements are available. These N measurements are uncertain and defined, in fact, from probability laws $P_{i \in [1,N]}$. The general framework set for the transformation process proposed is based on the sequential simulation technique. The transformation algorithm is as follows:

1) Randomly drawing a Gaussian white noise $z_{i, i \in [1,N]}$ each component of which is associated with a point $x_{i, i \in [1,N]}$.

2) Converting this Gaussian white noise to independent uniform numbers $u_{i, i \in [1,N]} = G(z_{i, i \in [1,N]})$.

3) Defining a random path visiting each point $x_{i, i \in [1,N]}$.

4) At iteration n+1, it is assumed that the n probability laws of the n points previously considered have been transformed into n standard normal values $F_{i, i \in [1,n]}$. At point $x_{n+1}$, the kriging estimator $F_K$ and the associated standard deviation $\sigma_K$ are then determined from the n values already defined.

5) Determining the distribution function H corresponding to the following probability law:

$$h \propto N(F_K, \sigma_K) P_{n+1}$$

where $N(F_K, \sigma_K)$ is the normal probability law of average $F_K$ and of standard deviation $\sigma_K \cdot F_{n+1} = H^{-1}[u_{n+1}]$ is then estimated. This value is thereafter added to the set of transformed data.

6) The next point defined from the random path is considered, and stages 4 and 5 are repeated. the procedure goes way until the N probability laws are transformed.

Some Particular Cases a) Uniform Probability Law

The probability laws $P_{i \in [1,N]}$ is assumed correspond to uniform distributions in intervals $[A_{n+1}, B_{n+1}]$. The following procedure is carried out in stage 5

$$F_{n+1} = \sigma_K f_{n+1} + F_K$$

with $$f_{n+1} = \tilde{G}^{-1}\left[u_{n+1}\left(\tilde{G}(a_{n+1}) - \tilde{G}(b_{n+1})\right) + \tilde{G}(a_{n+1})\right],$$

$$a_{n+1} = \frac{A_{n+1} - F_K}{\sigma_K} et$$

$$b_{n+1} = \frac{B_{n+1} - F_K}{\sigma_K}$$

This case corresponds to the truncated Gaussian method. The method according to the invention then allows constraining the Gaussian realization underlying the truncated Gaussian realization to pseudo-data representative of the facies observations at certain points. In other words, the facies realization is thus constrained to the facies observed in the wells.

b) Normal Probability Law

The probability law describing the measurement uncertainty is assumed to be a normal law of mean m and of standard deviation a. The following probability law then has to be determined:

$$h(x) = \frac{1}{a} \exp\left(-\frac{1}{2}\left[\left(\frac{x - F_K}{\sigma_K}\right)^2 + \left(\frac{x - m}{\sigma}\right)^2\right]\right)$$

where a is a normalization constant, as well as the corresponding distribution function H, which can be done from numerical techniques (see FIG. 1).

This case is suited to the description of any field insofar as it is brought back to a Gaussian field by anamorphosis.

Applications

Figure 2:
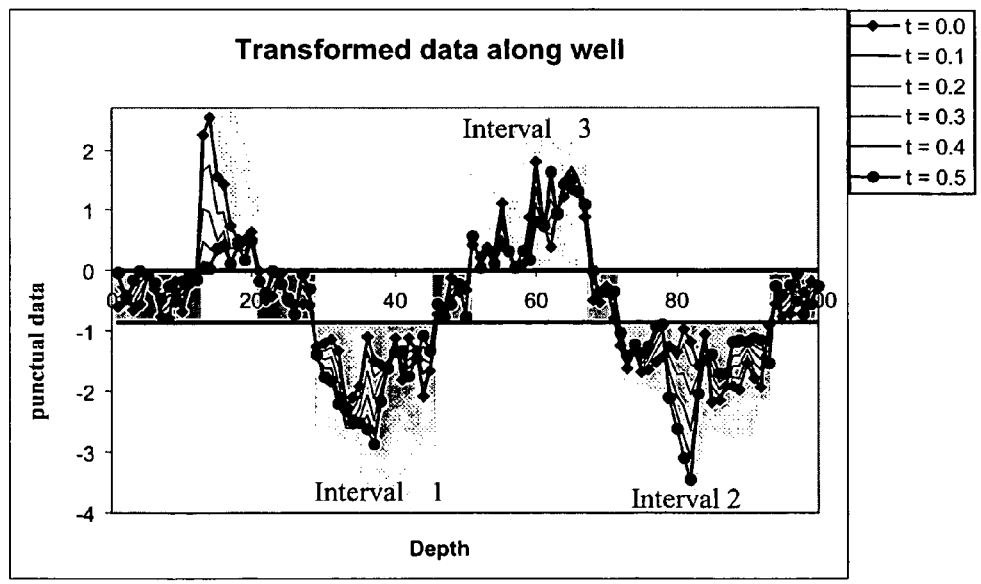
FIG. 2 shows two sets (t=0.0 and t=0.5) of punctual pseudo-data resulting from the transformation of uniform probability laws (truncated Gaussian) and the pseudo-data deduced therefrom by gradual deformation (t=0.1, 0.2, 0.3, 0.4)

FIG. 2 illustrates the transformation process proposed in the case of uniform probability laws. It is assumed that, at 100 points 1 m apart, the information "at this point, the modeled attribute belongs to interval 1, to interval 2 or to interval 3". Besides, the spatial structure is characterized by an exponential variogram with a 20-m correlation length. By applying the algorithm given above, these observations are transformed into punctual data (curve t=0.0). They all respect the intervals from which they are extracted and the spatial variability model. When taking as the starting point a new Gaussian white noise, a new set of punctual data is obtained (curve t=0.5).

The advantage of the transformation algorithm is compatibility with the gradual deformation method. It is in fact possible to apply the formalism of the gradual deformation to combine two Gaussian white noises $z_{i,i\in[1,N]}$ which provide each a set of pseudo-data in accordance with the spatial variability model and the probability laws linked with the measuring points. An example is shown in FIG. 2 within the context of a uniform probability law. The Gaussian white noises that have led to curves t=0.0 and t=0.5 are combined. By varying deformation parameter t, we obtain other sets of punctual data respecting the spatial structure and the uniform laws required.

Conditioning by the Static and Dynamic Data

Figure 3:
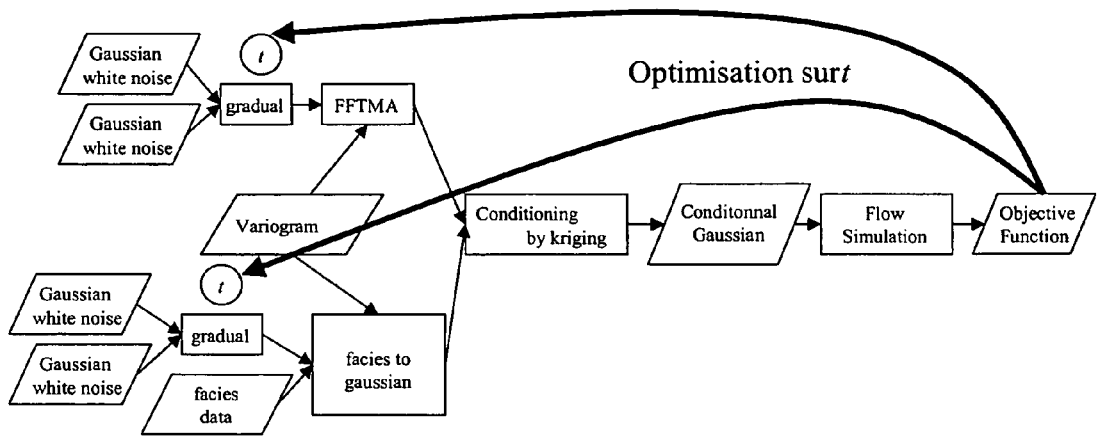
FIG. 3 shows the optimization process developed to construct realizations constrained to the static (of probability law type) and dynamic data by gradual deformation.

The advantage of the transformation algorithm presented in the previous section is its full compatibility with the gradual deformation method. Now, this method is a very convenient parameterization technique within the context of stochastic optimization: it allows deformation of the distribution of an attribute by means of a small number of parameters while preserving the spatial structure. The transformation technique presented above is integrated into the optimization process, according to the scheme described in FIG. 3.

At the start an initial Gaussian white noise and a complementary Gaussian white noise is considered for the realization, likewise for the static observations. In both cases, the initial noise is combined with the complementary noise according to the gradual deformation principles, this combination being controlled by a deformation parameter t. In reality, two different deformation parameters could be chosen, one for the realization and one for the static observations. It is assumed here these two parameters are identical so as to have a one-dimensional problem. Then, for the realization, the Gaussian white noise from the gradual combination is transformed into a structured Gaussian realization (FFTMA component). In parallel, for the static observations, the Gaussian white noise from the gradual combination is transformed into punctual pseudo-data in accordance with the probability laws observed. These pseudo-data are then used to constrain the realization provided by the FFTMA component. A flow simulation is carried out for the constrained realization which supplies production data (for example pressures, breakthrough times, flow rates, etc.). These simulated data are then compared with the dynamic data observed in the field by means of the objective function. During the optimization process, parameter t is modified in order to reduce the objective function. Then, this search technique is continued further with new complementary Gaussian white noises.

Numerical Example

A synthetic reservoir model is constructed on which the method according to the invention is tested. The facies of a reservoir are considered for which the nature of the facies at the well bottom have been observed. This reservoir is simulated by means of the truncated Gaussian method: the facies are then closely linked with uniform probability laws, that is intervals whose width depends on the proportion of the facies. The truncated Gaussian technique applies thresholdings, according to the intervals defined, to a continuous standard Gaussian realization so as to transform it into a discrete realization. At the observation points, the values of the continuous Gaussian realization are constrained by the intervals characterizing the facies which are observed.

Figure 4:
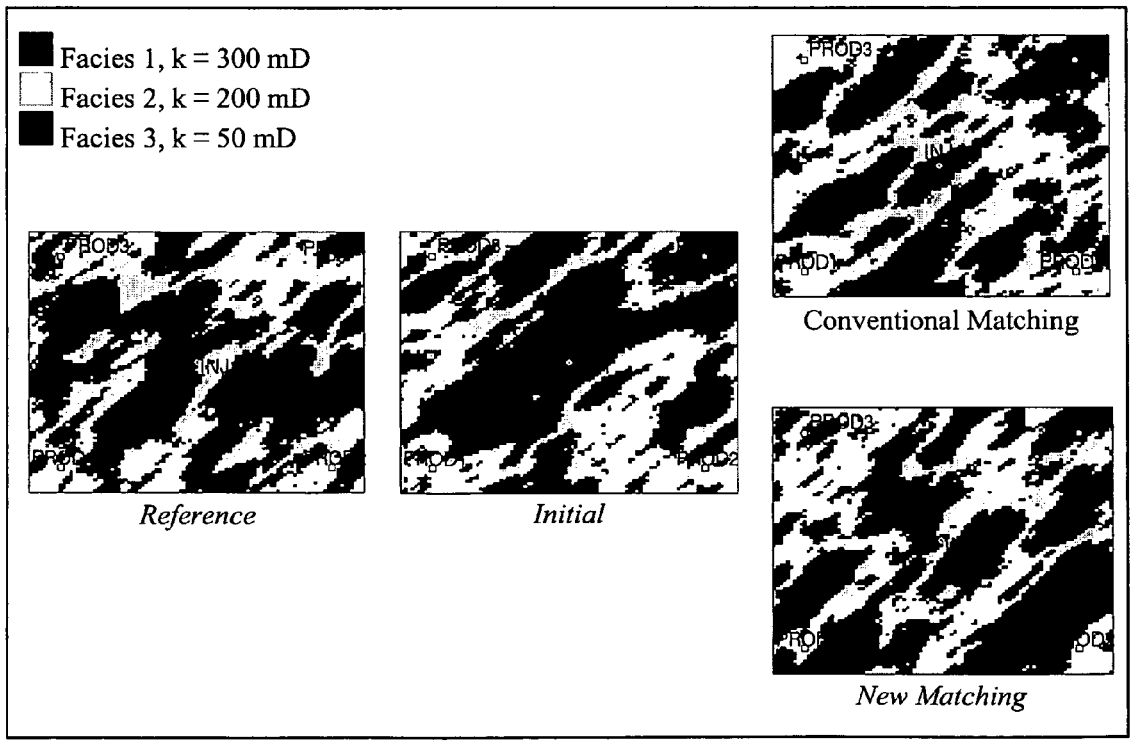
FIG. 4 shows the facies distributions for the reference reservoir, the reservoir taken as starting point for the optimization and the reservoirs obtained at the end of the optimization after modifying or not the pseudo-data deduced from the conversion of the bottom hole facies observations.
Figure 5:
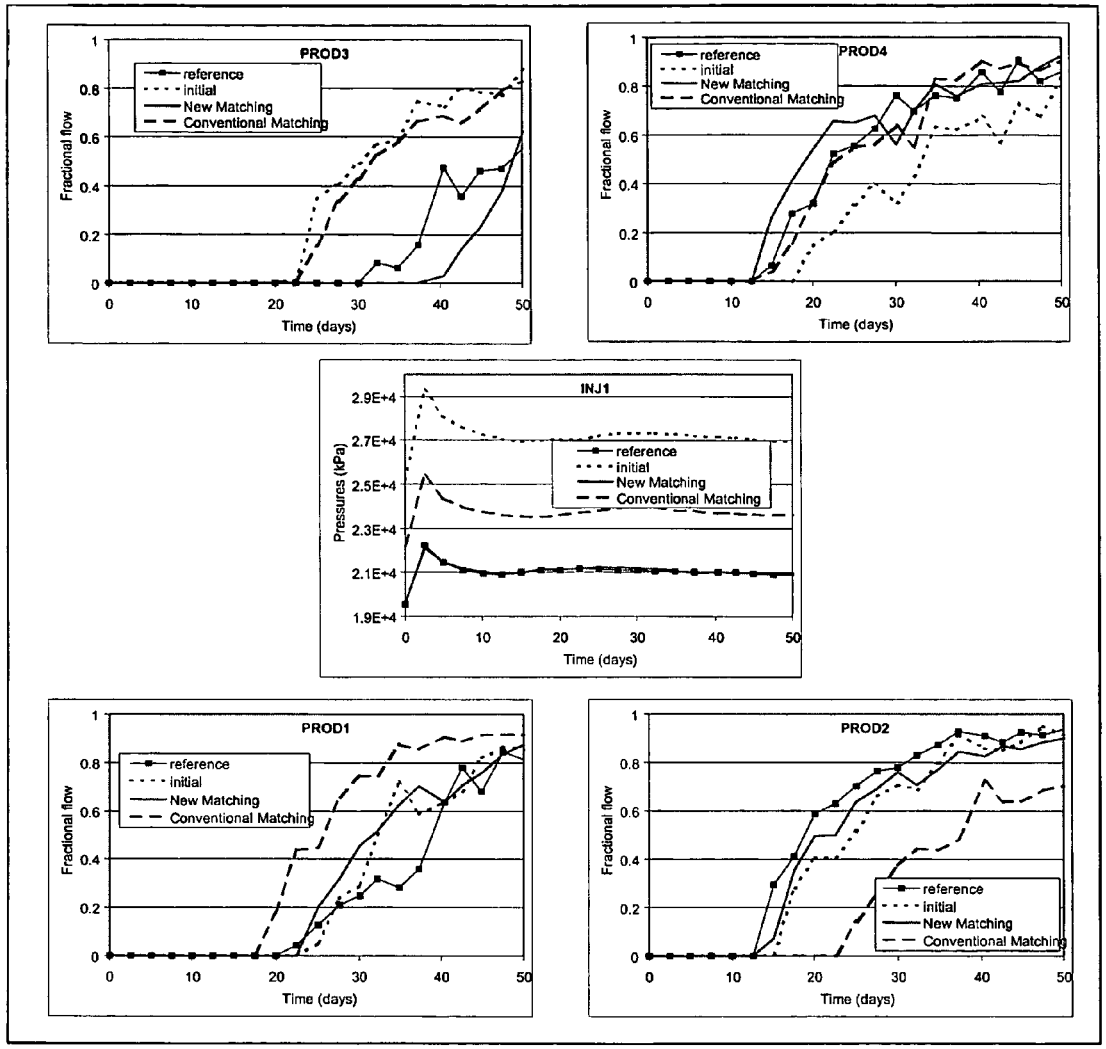
FIG. 5 shows the fractional flows simulated for the producing wells and the pressures in the injection well.

The synthetic reference reservoir is shown in FIG. 4. It is a monolayer reservoir comprising 100×100 grid cells, 10 m thick and 10 m in side. The reservoir comprises three facies: 25% facies 1, 35% facies 2 and 40% facies 3. Their permeabilities are 300 mD, 200 mD and 50 mD respectively. The Gaussian realization used to obtain the truncated realization is characterized by a stable, anisotropic variogram of exponent $\alpha=1.5$:

$$\gamma(h) = \sigma^2\left(1 - \exp\left(-\frac{h}{l_c}\right)^\alpha\right)$$

h is the distance, $l_c$ the correlation length and $\sigma$ the standard deviation. The correlation length is 50 m along the principal axis (1;1;0) and 20 m along the perpendicular axis (−1;1;0). The porosity is constant and equal to 0.4. This is a well where water is injected at the center and four producing wells we located in the corners. The reservoir is assumed to be initially oil saturated. The relative permeability curves for oil and water follow Corey's laws with an exponent 2. The mobility ratio is 1. The production record for this reference reservoir is shown in FIG. 5. The facies observed at the bottom of the wells are given in Table 1.

TABLE 1

| Facies observed at the well bottom | |
|---|---|
| Well | Facies |
| INJ1 | 3 |
| PROD1 | 2 |
| PROD2 | 2 |
| PROD3 | 2 |
| PROD4 | 1 |

The object of the inverse problem is to determine a reservoir model coherent with the dynamic data and the facies observed at the bottom of the wells, the facies distribution being assumed to be unknown. Two optimization processes are therefore launched, starting from the same initial realization (FIG. 4). For each process, a single optimization parameter is considered, that is the deformation parameter. The first process is based on a conventional approach: the Gaussian values representative of the facies observed at the well bottom are constant during optimization. For the second process, the approach of the invention is tested by varying these Gaussian values.

Figure 6:
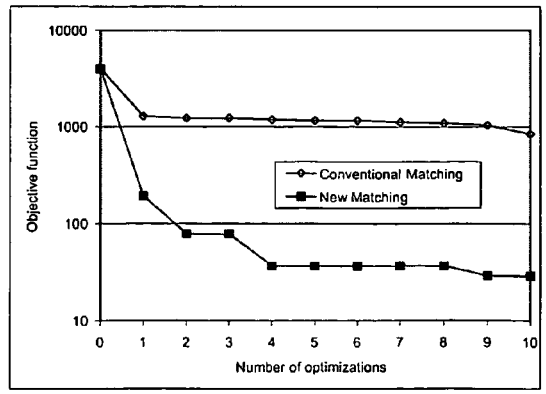
FIG. 6 shows the evolution of the objective function for optimizations performed without modifying the bottom hole pseudo-data (Conventional Matching) and by modifying them (New Matching).

It can be observed that, by making variations at the level of the Gaussian values representative of the facies observed at the well bottom possible (uniform probability laws), minimization of the objective function is significantly accelerated (FIG. 6).

So far, an implementation of the method has been described within the preferred context of a process of gradual deformation of the model realizations, which imposes that the coefficients of the realization combinations performed are such that the sum of the squares of the combination coefficients is 1.

However, without departing from the scope of the invention, the transformation technique described, which associates a probability law characterizing an uncertain local measurement with a punctual pseudo-datum in accordance with the probability law from which it results and a spatial variability model, can be applied to another stochastic model optimization approach known in the art, such as the method known as pilot point method.

The invention claimed is:

1. A computer implemented method for generating an image of an underground zone adjusted to dynamic data and uncertain static data, the uncertain static data resulting from known probability laws and a spatial variability model, by performing with the computer the steps comprising:

generating at least two representations of a stochastic model, the representations showing how a physical property of the underground zone is distributed in the underground zone;

optimizing the representations by using a first deformation process of the at least two representations controlled by at least a first deformation parameter, so that the representations are adjusted to the dynamic data;

transforming the probability laws according to the spatial variability model into unique pseudo-data;

adjusting the pseudo-data by using an iterative process wherein a first Gaussian white noise associated with the pseudo-data is combined with a second Gaussian white noise;

optimizing the representations adjusted to the dynamic data, so that the representations are adjusted to the uncertain static data; and generating the image of the underground zone by using a representation of a distribution of a physical property of the underground zone optimized so that the representation is adjusted to both the dynamic and the uncertain static data.

2. A method as claimed in claim 1, wherein the pseudo-data are obtained by:

computing a kriging estimator $F_K$ of the unique pseudo-data already computed, and an associated standard deviation $\sigma_K$;

generating an independent uniform number;

computing a distribution function corresponding to a probability law h, h being a normal probability law of an average of $F_K$ and of the standard deviation $\sigma_K$ multiplied by the probability laws; and determining the pseudo-data by calculating an inverse of the distribution function for the uniform member.

3. A method as claimed in claim 1, wherein the first deformation process comprises optimizing the representations by using an iterative deformation process comprising linearly combining a first representation and at least a second independent representation generated from the stochastic model, the linear combination being defined by a first set of combination coefficients controlled by the at least the first deformation parameter.

4. A method as claimed in claim 1, wherein the iterative process is a second deformation process using a second set of combination coefficients controlled by at least a second deformation parameter.

5. A method as claimed in claim 3, wherein a sum of squares of the first set of combination coefficients is 1.

6. A method as claimed in claim 4, wherein a sum of squares of the second set of combination coefficients is 1.

7. A method as claimed in claim 1, wherein the probability laws are normal laws or uniform laws.

8. The method as claimed in claim 4, wherein the first and second deformation parameters are identical.

9. The method as claimed in claim 6, wherein the first and second deformation parameters are identical.

10. The method as claimed in claim 1, wherein the stochastic model is a Gaussian or Gaussian-related type.

11. The method as claimed in claim 2, wherein the stochastic model is a Gaussian model or Gaussian-related model.

12. The method as claimed in claim 3, wherein the stochastic model is a Gaussian model or Gaussian-related model.

13. The method as claimed in claim 4, wherein the stochastic model is a Gaussian model or Gaussian-related model.

14. The method as claimed in claim 5, wherein the stochastic model is a Gaussian model or Gaussian-related model.

15. The method as claimed in claim 6, wherein the stochastic model is a Gaussian model or Gaussian-related model.

16. The method as claimed in claim 7, wherein the stochastic model is a Gaussian model or Gaussian-related model.

17. The method as claimed in claim 8, wherein the stochastic model is a Gaussian model or Gaussian-related model.

18. The method as claimed in claim 9, wherein the stochastic model is a Gaussian model or Gaussian-related model.

* * * * *